(12) United States Patent
Garnier

(10) Patent No.: US 11,994,033 B2
(45) Date of Patent: May 28, 2024

(54) MODULAR AND AUTONOMOUS ASSEMBLY FOR DETECTING THE ANGULAR POSITION OF THE BLADES OF AN IMPELLER AND MODULAR AND AUTONOMOUS ASSEMBLY FOR DETECTING DAMAGE TO THE BLADES OF AN IMPELLER OF A TURBINE ENGINE

(71) Applicant: SAFRAN AIRCRAFT ENGINES, Paris (FR)

(72) Inventor: Alméric Pierre Louis Garnier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 12 days.

(21) Appl. No.: 17/755,995

(22) PCT Filed: Nov. 13, 2020

(86) PCT No.: PCT/FR2020/052085
§ 371 (c)(1),
(2) Date: May 13, 2022

(87) PCT Pub. No.: WO2021/094700
PCT Pub. Date: May 20, 2021

(65) Prior Publication Data
US 2022/0403752 A1 Dec. 22, 2022

(30) Foreign Application Priority Data
Nov. 14, 2019 (FR) .................................. 1912726

(51) Int. Cl.
*F01D 17/02* (2006.01)
*F01D 21/00* (2006.01)
*G01B 21/22* (2006.01)

(52) U.S. Cl.
CPC ........... *F01D 17/02* (2013.01); *F01D 21/003* (2013.01); *G01B 21/22* (2013.01);
(Continued)

(58) Field of Classification Search
CPC ..... F01D 17/02; F01D 17/06; F05D 2220/323
See application file for complete search history.

(56) References Cited

U.S. PATENT DOCUMENTS 4,948,337 A * 8/1990 Martin .................. B64C 11/301
416/89
8,528,317 B2 9/2013 Gerez et al.
(Continued)

FOREIGN PATENT DOCUMENTS

EP 2661611 B1 11/2019
FR 3030625 A1 6/2016

OTHER PUBLICATIONS

International Search Report issued in International Application PCT/FR2020/052085 on Feb. 12, 2021, with English Translation (5 pages).
(Continued)

*Primary Examiner* — Long T Tran
(74) *Attorney, Agent, or Firm* — Bookoff McAndrews, PLLC

(57) ABSTRACT

A modular and autonomous assembly for detecting the angular position of the blades of an impeller intended to be mounted on a turbine engine, the assembly comprises at least one electrical power source allowing the operation of the elements of the detection assembly independently of the turbine engine on which it is intended to be carried, at least one first sensor intended to be associated with the first impeller, at least one second sensor intended to be associated with the second impeller, and a main housing including a processing unit and storage means.

18 Claims, 6 Drawing Sheets

(52) U.S. Cl.
  CPC .... *F05D 2220/323* (2013.01); *F05D 2260/80* (2013.01); *F05D 2260/83* (2013.01)

(56) References Cited

U.S. PATENT DOCUMENTS

| | | | |
|---|---|---|---|
| 10,851,657 B2* | 12/2020 | Polo Filisan | G01B 11/26 |
| 2010/0219942 A1* | 9/2010 | Lee | G06K 19/07749 |
| | | | 340/10.51 |
| 2010/0290909 A1* | 11/2010 | Greciet | G01B 11/272 |
| | | | 416/61 |
| 2011/0103933 A1* | 5/2011 | Olesen | F03D 17/00 |
| | | | 415/118 |
| 2012/0101775 A1* | 4/2012 | Mitchell | F01D 21/003 |
| | | | 702/183 |
| 2012/0148400 A1 | 6/2012 | Gerez et al. | |
| 2015/0041122 A1* | 2/2015 | Valsecchi | G01F 1/74 |
| | | | 166/250.15 |
| 2017/0211411 A1 | 7/2017 | Shepard | |
| 2018/0051587 A1* | 2/2018 | Fletcher | F04D 25/045 |
| 2018/0224353 A1 | 8/2018 | Gysling et al. | |
| 2019/0195076 A1* | 6/2019 | Polo Filisan | F01D 7/00 |
| 2019/0212188 A1* | 7/2019 | Diamond | G01H 11/00 |
| 2020/0247529 A1* | 8/2020 | Lauria | G01D 5/247 |

OTHER PUBLICATIONS

French Search Report issued in FR1912726 on Jun. 30, 2020 (2 pages).
Written Opinion issued in International Application PCT/FR2020/052085 on Feb. 12, 2021, (16 pages).

\* cited by examiner

[Fig. 1]
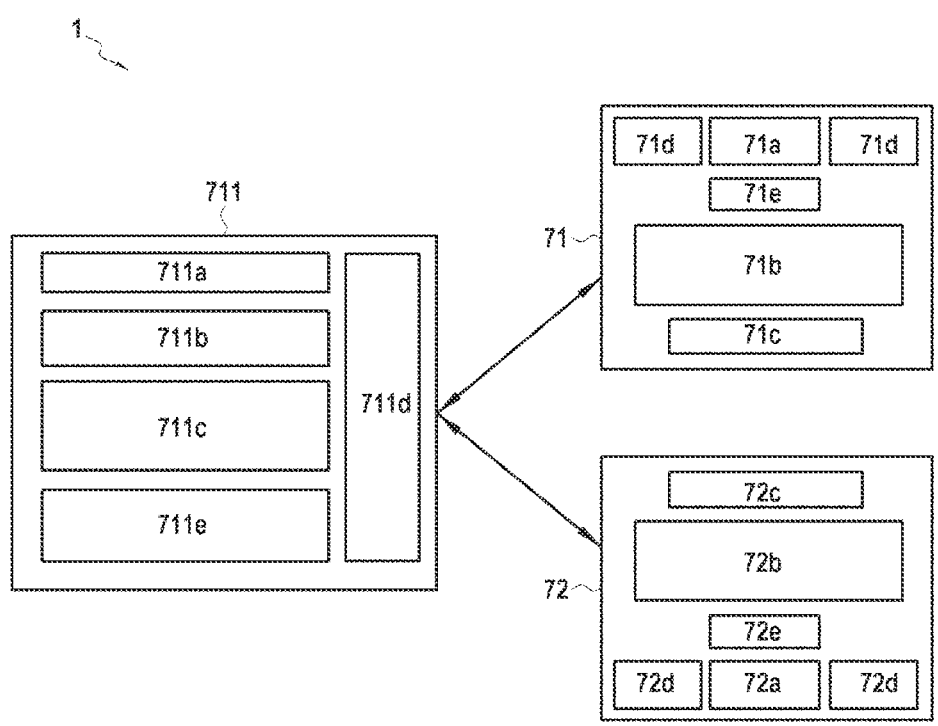

[Fig. 2]
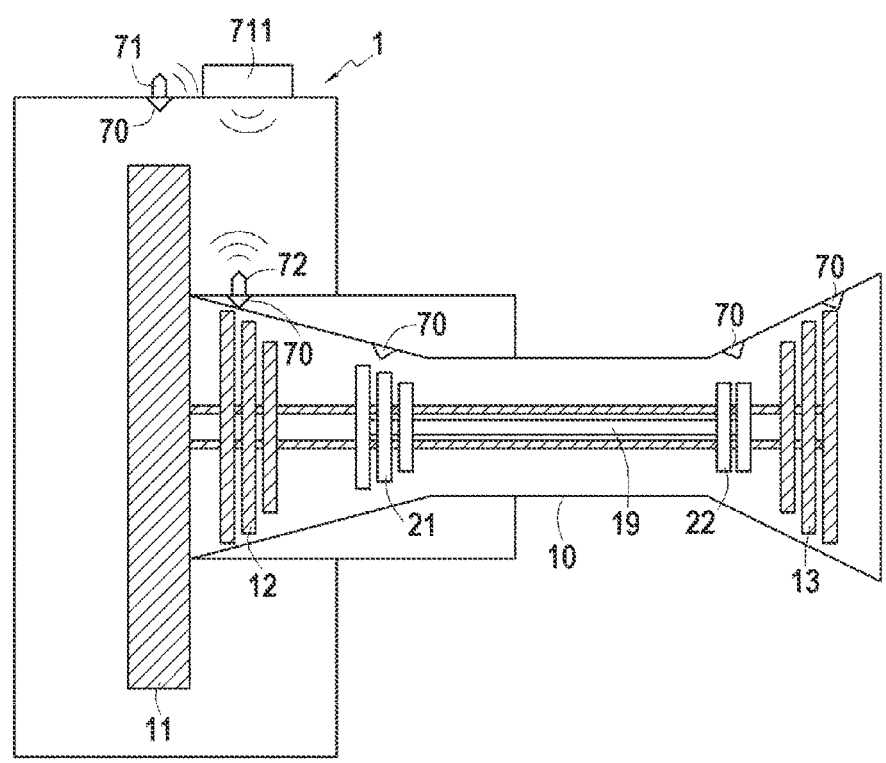

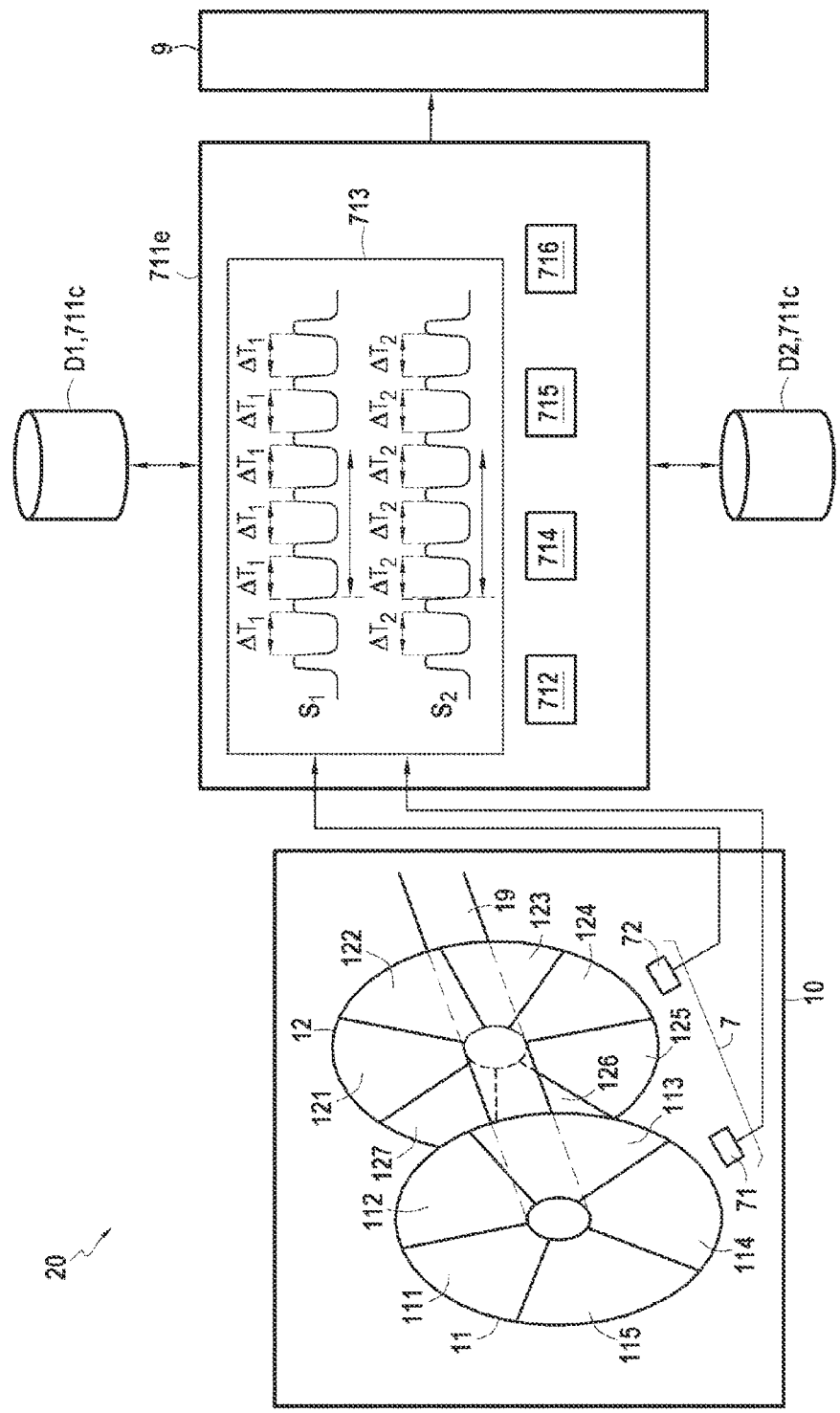
[Fig. 3]

[Fig. 4]

[Fig. 5]
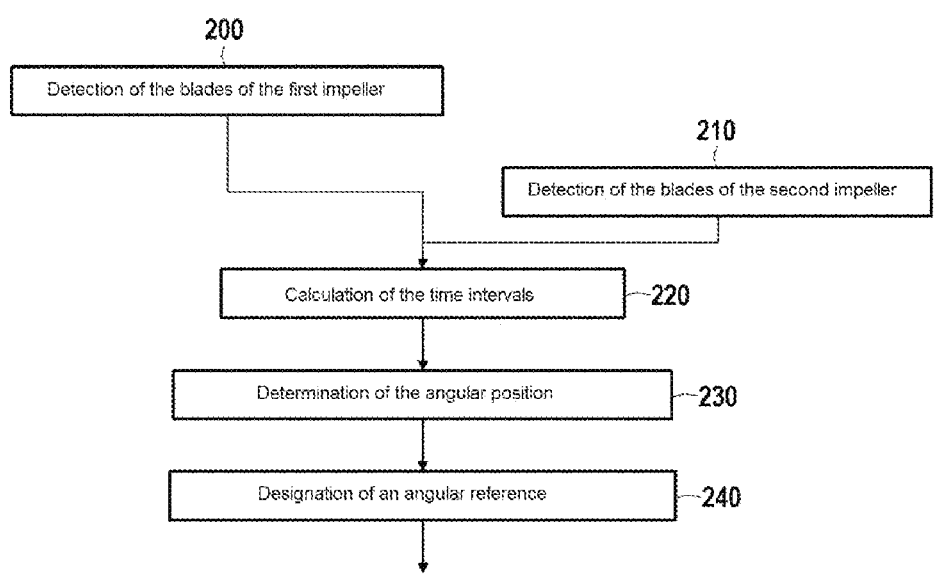

[Fig. 6]
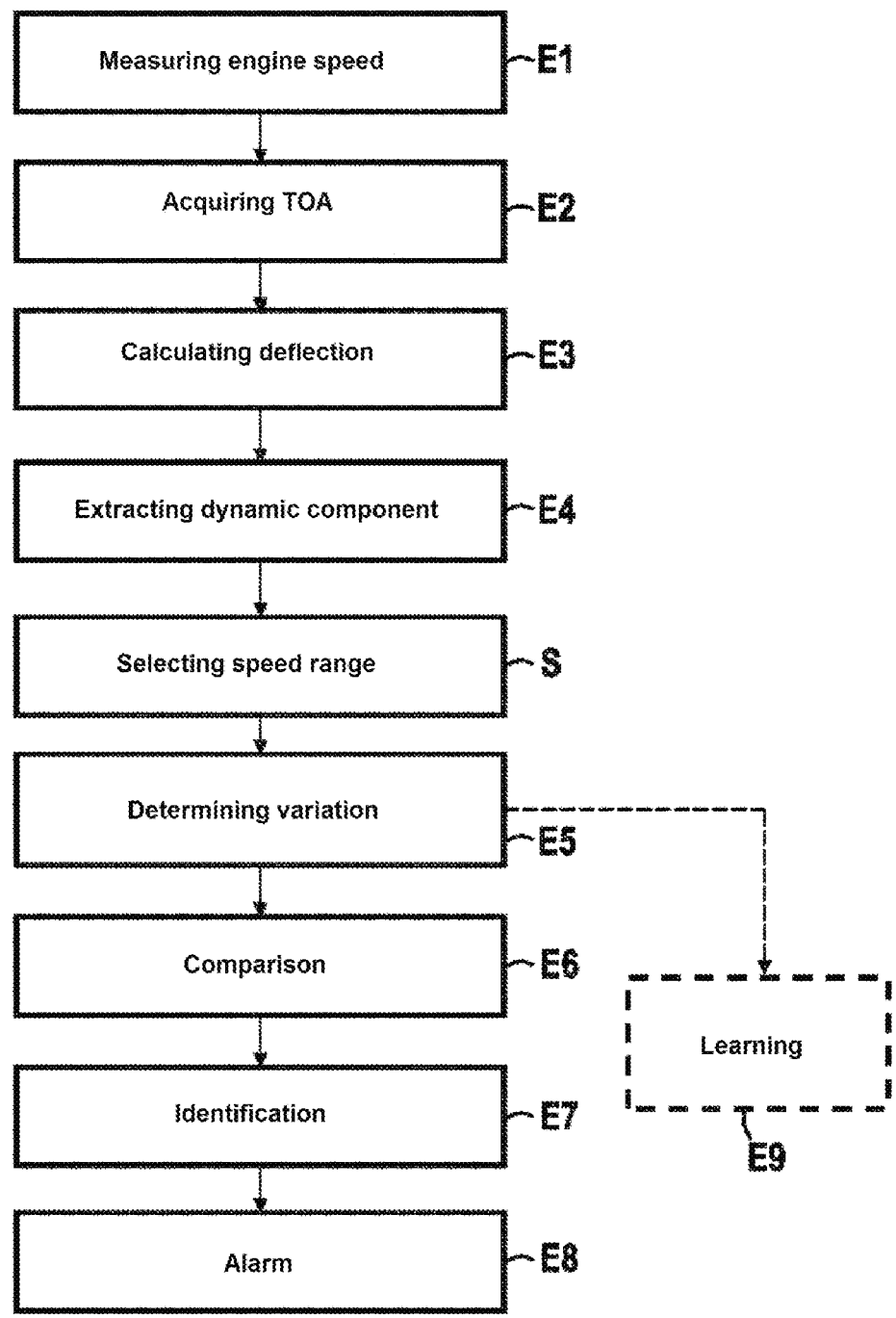

MODULAR AND AUTONOMOUS ASSEMBLY FOR DETECTING THE ANGULAR POSITION OF THE BLADES OF AN IMPELLER AND MODULAR AND AUTONOMOUS ASSEMBLY FOR DETECTING DAMAGE TO THE BLADES OF AN IMPELLER OF A TURBINE ENGINE

CROSS-REFERENCE TO RELATED APPLICATION(S)

This patent application is the U.S. National Phase Entry under 35 U.S.C. § 371 of International Application No. PCT/FR2020/052085, filed on Nov. 13, 2020, which claims priority to French Patent Application No. 1912726, filed on Nov. 14, 2019.

TECHNICAL FIELD

The invention relates to the field of monitoring an aircraft engine and more particularly to the individual identification of the blades of a blading set, particularly for detecting possible damage or imbalance on one or more movable blades on one or more impellers of an aircraft engine.

PRIOR ART

The fans of new generation aircraft engines are equipped with composite blades. The integration of these blades in a fan allows substantial improvement in its performance and a non-negligible mass saving.

However, monitoring the state of health of composite blades has proven to be complex to implement.

Although for metal blades a simple inspection with the naked eye allows detecting directly possible damage to them, detection of this type has proven to be limited for composite blades. For example, a shock on a composite blade can cause delamination and internal damage not observable with the naked eye and therefore more difficult to detect.

Composite blades being products with a large added value, it is strongly desirable to be able to plan their conditional maintenance in advance in order to reduce the delays and costs of ground maintenance of the aircraft. The planning of this maintenance therefore requires high-performance detection and identification of any possible damage to a blade.

One known method of detecting damage to a blade consists of using tip-timing sensors. These sensors detect and count the passage of blades relative to a time base. The measurements of the tip-timing sensors are then used to calculate the natural frequency of each blade, the natural frequency giving information regarding the state of health of the blade.

In practice, this method necessitates a large number of tip-timing sensors to carry out the measurements, as well as large computing resources in order to determine the natural frequencies of each blade. This solution is therefore applicable only on the test bench, where integration constraints (for ex: bulk, mass, available computing resources) are smaller. A solution of this type is however not transposable for a system carried aboard an aircraft, taking into account the constraints of integration and the computing resources required. Flight to flight monitoring of the state of health of the blades is therefore not possible without immobilizing the engine of the aircraft on the ground.

Another known solution for detecting damage consists of monitoring the natural frequency of each blade by means of a "Ping test." During this test, each blade is excited by means of a shock-type impulse, measurement of the impulsive frequency response of each of them allows the detection of possible damage. Nevertheless, here again a method of this type requires immobilization of the engine of the aircraft on order to be implemented.

There exists a need for an on-board solution in an aircraft allowing checking the state of health of each of its blades and providing monitoring of their state of health flight by flight. Generally, this need relates to all types of blades, the latter being able to be made of composite material as well as of any other material, metal for example.

The individual identification of the blades of a blading set is of primary importance, both for balancing the blading as for the functions of monitoring the state of health of the blading. This identification can be carried out by the detection of information called "Top-Turn."

The Top-Turn is a fixed reference point, such as an engine casing for example, with respect to an element in rotation, such as for example a low-pressure shaft or a high-pressure shaft.

This position allows knowing the angular position of the low-pressure shaft with respect to the casing (in the fixed frame of reference).

In fact, the rotors of the aircraft engine necessitate being balanced in order to ensure good compliance with vibration limits on the engine. To this end, it is necessary to compensate the measured imbalance, or misalignment, by positioning one or more masses at precise angular positions in the fixed frame of reference. The top-turn then allows defining the attachment positions of these masses. The identification made by a man must match that made by a machine (on-board system) which is in support.

Usually, one method of detecting the top-turn consists of using a sensor, called a top-turn sensor, which detects the passage of teeth, or blades facing it and particularly the passage of a singular tooth of the blading (here the impeller) facing it. This sprocket, called the phonic wheel, is characterized in that it has a singularity, which can be the presence of an excess or a localized absence of matter on the sprocket. This anomaly is detected by a means such as a capacitive sensor or a Hall Effect sensor for example. The detection of this anomaly allows knowing the reference angular position for the entire sprocket.

The phonic wheel has no other function than providing this angular reference and serving as a point for measuring the speed of rotation of the rotating portions to which it is attached.

The phonic wheel does not see flow. It has no so-called aerodynamic function and therefore does not participate in the propulsion of the engine.

However, this phonic wheel has an impact both on the mass of the aircraft, the more so when it is in rotation, and on integration given that this specific part is added on the low-pressure shaft of the engine and that it is necessary to integrate the sensor up to the phonic wheel, particularly with difficulties linked to the implementation tolerances.

It can therefore be advantageous to not integrate a phonic wheel and to obtain top-turn information with another method.

Known from document US 2012/148400 is detection of the top-turn based on detection of a singularity on a blade of a blading set other than the phonic wheel, in order to be able to dispense with it.

Also known from document EP 2 661 611 is a system for replacing speed measurement carried out via the phonic wheel. When the shaft is sectioned, the phonic wheel located upstream of the break cannot translate the speed of rotation of the turbine. This information is of primary importance for regulation so that the turbine does not overspeed.

In this method, to obtain the information, one blade must have a different profile so as to generate a different pressure profile.

Also known from document U.S. Pat. No. 8,528,317 is a method for monitoring FOD on a turbofan using top-turn information: "beep per turn," of the phonic wheel.

Also known is a method for identifying a top-turn via the difference in the distribution of the teeth of a phonic wheel. In fact, the difference in proximity will have an influence on the passage time detected by the top-turn sensor. By algorithmic processing, this singularity in the time deltas allows identifying the singularity in the distribution of the blading and therefore the identification of an angular reference.

All the solutions known and mentioned above propose accomplishing the top turn by creating a singularity on blading or a phonic wheel.

The introduction of a singular blade in the turbine engine, which has different disadvantages such as the necessity of developing a specific part, as well as providing production management for different blades, causes different behavior in it compared to the other blades of the turbine engine. Problems with certifying the turbine engine and increasing complexity of maintenance of the turbine engine, as well as aerodynamic and vibration perturbations due to the singularity of the singular blade, and therefore a degradation of performance, then exist.

The known methods described above also have the disadvantage of generating unequally distributed positioning of a blade, i.e. angularly irregular relative to the other blades. It is possible to have unequal distribution of the blades in a blading set, but this would also cause constraints in manufacture and aerodynamic perturbations having a negative impact on the performance of the engine.

The known methods described above also have the disadvantage that the sensors must have adequate bandwidth for the detection of the passage of all the blades, for all the speed ranges adopted. In fact, if the speed is too high or if the number of blades is too great, a capacitive sensor will not be able to distinguish the blades, and it will be necessary to use an optical sensor, for example.

Finally, the known methods and systems described above also have as disadvantages the fact of requiring the return of information relative to the top-turn via the computer where the processing can take place. This raises the problem of the independence of the proposed monitoring with respect to a system of the FADEC (Full Authority Digital Engine Control) type, and more particularly with respect to the digital engine control device ECU (Engine Control Unit) or to the device for monitoring the engine state of health EMU (Engine Motor Unit), as well as other problems of integration, and therefore of mass impact, since the proposed solutions are all intended to be integrated permanently on a turbine engine.

DISCLOSURE OF THE INVENTION

The present invention has as its object to correct the aforementioned disadvantages by offering a removable solution independent of the computers of the turbine engine and of the power supply of the turbine engine, and allowing an angular reference of the top-turn type to be generated and storing the generated signals.

To this end, the present invention proposes a modular and autonomous assembly for detecting the angular position of the blades of an impeller, the assembly being intended to be mounted on a turbine engine.

According to a general feature of the invention, the assembly comprises at least one electrical power source allowing the operation of the elements of the detection assembly independently of the turbine engine on which it is intended to be carried, at least one first sensor intended to be associated with the first impeller, at least one second sensor intended to be associated with the second impeller, and a main housing including a main processing unit and storage means.

The invention also allows supplying a solution in the form of a kit independent of any turbine engine, with a main housing and different sensors. The assembly according to the invention can thus be mechanically attached to a turbine engine to accomplish its mission of detecting the angular position while remaining independent of the turbine engine both in terms of electrical power supply due to the power supply source and in information processing capacity due to the main processing unit, in other words by remaining independent of the computers of the turbine engine. This without having an impact on the operation of the turbine engine.

The autonomy of the modular measurement assembly provided by the electrical power supply source allows installing the modular assembly intermittently on a turbine engine, and thus reducing the mass impact over time.

According to a first aspect of the autonomous and modular detection assembly, the main housing, said at least one first sensor and said at least one second sensor can each comprise reversible manual attachment means allowing them to be removably mounted on the turbine engine.

What is meant by manual attachment means is means allowing attaching to the turbine engine without resorting to any tool. Each of the elements of the assembly can thus be mounted and removed on the turbine engine easily without any tool.

A detection assembly of this type has a mass of less than one kilogram. The modularity of the assembly provided by its removable nature allows having only an intermittent mass impact on a turbine engine over the long term, and by extension on an aircraft, linked to the carrying of an assembly of this type on the turbine engine. In fact, the monitoring of the blading of a turbine engine does not necessarily have to be done continuously. The degradations of the state of health of the blading to be identified being permanent, an intermittent check, following a flight or during a flight, every three flights for example or following an event (for example the ingestion of a foreign body), is sufficient. The assembly carries the entire device necessary for the monitoring during the check, before being withdrawn from the turbine engine.

In addition, the modularity of the on-board assembly as a Plug & Play kit allows it to be mounted intermittently on at least one turbine engine and thus avoid having two on-board systems on the same aircraft.

The modularity of the assembly also allows selecting to use the assembly only on the ground, which avoids the need of a certification of the assembly, the certification of the assembly being necessary for any device carried on board in flight.

The storage means allow storing the data collected by the sensors for the purpose of their processing in flight by the processing unit of the main housing. The storage means also allow carrying the necessary and suitable information to have the reference base suited to each stage of the monitored blading and thus allow carrying out detection in flight.

With four sensors and one main housing, it is possible for example to monitor four stages of the same rotating shaft or two different shafts.

According to a second aspect of the autonomous and modular detection assembly, each first and second sensor can comprise a detection module, a local processing module, and communication means configured to deliver the measurements of the corresponding sensor to the main processing unit.

The sensors can have different configurations to be adapted to different environments of a turbine engine. The difference in temperature between a rear position on the body of the turbine and that in the compressor position is on the order of 200 to 250° C. Certain sensors can thus be configured to resist the highest temperatures expected.

According to a preferred embodiment of the second aspect, each first and second sensor also comprises a power supply for the sensor, and the communication means are wireless communication means.

The use of wireless communication means and of a power source for each sensor and for the main housing allows facilitating the installation of the different elements of the assembly because it avoids having to connect the sensors to the main housing and therefore passing cables between the different elements.

According to a third aspect of the autonomous and modular detection assembly in which the assembly is intended to be mounted on a turbine engine including a first impeller comprising a first number of blades and a second impeller comprising a second number, each of the two impellers having an air flow passing through it and being coupled directly or indirectly to one another, and the first number of blades of the first impeller and the second number of blades of the second impeller being distinct and mutually prime, each of said sensors being configured to generate a signal at each passage of a blade of an impeller in front of the sensor, and the main processing unit can be configured to determine the time interval separating the detection of a blade of the first impeller with the detection of each of the blades of the second impeller.

This configuration thus allows detecting the angular position of the blades of an impeller of a turbine engine in the absence of a phonic wheel, which allows a saving in rotating mass and in bulk, or in the absence of a singularity on a blade of the impeller, which allows avoiding introducing an aerodynamic perturbation into the flow of the turbine engine. This detection is accomplished by using the time information of two bladings which do not have the same number of blades.

In addition, this detection can be accomplished both when the aircraft is on the ground as when it is in flight.

This configuration advantageously uses the blading already present on the shaft of the turbine engine and dedicated to propulsion. The comparison of the time signal between the two bladings thus allows obtaining an angular reference of the Top-Turn type. In fact, it is thus possible to form an angular reference based on the pitch of the blades of the two relatively moving impellers.

More particularly, the comparison of the passage time of the blades of the first impeller to the passage time of the blades of the second impeller consecutively allows identifying a pattern, i.e. a signature. This signature allows identifying each blade in particular and defining it as being the Top-Turn.

In the case where the first and second impellers are driven by the same shaft, the drive is direct. In the case where the first and second impellers are driven respectively by a first shaft and a second shaft, the first shaft and the second shaft being mechanically connected by means of a speed reduction device, the two wheels are driven indirectly by the same shaft.

In addition, the assembly can comprises a determination module intended to determine the speed of rotation of the shaft or of the shafts driving the two impellers, the determination of the relative angular position taking into account the rotation speed(s) determined.

The signature varies depending on the speed of the shaft. The gaps being linked to the distribution of the blades, they can be normalized by the speed of rotation with a known number of blades. The detection logic of the Top-Turn is also not dependent on the speed of rotation of the shaft in this sense.

According to a preferred embodiment of the third aspect, the assembly can comprise a first sensor and a second sensor intended to be mounted on the first impeller of the turbine engine and a third and fourth sensors intended to be mounted on the second impeller of the turbine engine, the first and the second sensor being of two different types, and the third and fourth sensors being of two different types, the type of the sensor being selected in particular among the optical, magnetic and capacitive types.

The couple of parameters comprising the blade number of the disks and the speed of the shaft condition the technology of the sensors to be used to ensure good resolution on the acquisition of the passage times and the distinction of the detected blades.

According to a fourth aspect of the autonomous and modular detection assembly, the main housing can also comprise a clock module on which are synchronized said at least one first and at least one second sensors.

The synchronization of the sensors on the same time base can improve the accuracy of measurement of the time intervals for detecting the passage of the blades.

According to a fifth aspect of the autonomous and modular detection assembly, said at least one first and at least one second sensor can have a frequency bandwidth corresponding to the rotation speeds of the shaft for which the blades are detected.

In another aspect of the invention, an assembly for detecting damage to a blade of an impeller of a turbine engine is proposed, comprising a modular and autonomous assembly for detecting the angular position of the blades of an impeller as defined above, and alarm means.

In another aspect of the invention, a turbine engine configured to receive a modular and autonomous assembly for detecting the angular position of the blades of an impeller as defined above is proposed, comprising a recess and a hatch for access to said recess for each element of the assembly among the main housing, said at least one first and said at least one second sensor.

The attachment zones of the elements of the assembly, or recesses, provided on the turbine engine guarantee easy access, and allow the Kit, i.e. the assembly, to be mounted and removed within the same order of magnitude as an LRU (Light Replaceable Unit) part, namely 20 minutes not including action on the covering.

According to a first aspect of the turbine engine, the latter can comprise a first impeller including a first number of blades and a second impeller comprising a second number of blades, each of the two impellers having an air flow passing through it and being coupled directly or indirectly to one another, and the first number of blades of the first impeller and the second number of blades of the second impeller being distinct and mutually prime.

According to a second aspect of the turbine engine, the first number of blades is preferably at least equal to two and the second number of blades is at least equal to three.

Another object of the invention proposes an aircraft comprising at least one turbomachine as defined above.

BRIEF DESCRIPTION OF THE DRAWINGS

FIG. 1 shows schematically a modular and autonomous assembly for detecting the angular position of the blades of an impeller according to one embodiment of the invention.

FIG. 2 illustrates schematically a turbine engine according to one embodiment of the invention on which is mounted the modular and autonomous assembly for detecting the angular position of the blades of an impeller of FIG. 1.

FIG. 3 illustrates schematically an assembly for detecting damage to the movable blades of an impeller of an aircraft turbine engine having a first configuration.

FIG. 4 illustrates schematically an assembly for detecting damage to the movable blades of an impeller of an aircraft turbine engine having a second configuration.

FIG. 5 shows a flowchart of a method of detecting the angular position of the blades of an impeller of a turbine engine.

FIG. 6 shows a flowchart of a method of detecting damage to one or more movable blades constituting an impeller of an aircraft engine, the method comprising detecting the angular position of the blades of an impeller according to one embodiment of the invention.

DESCRIPTION OF THE EMBODIMENTS

The invention applies generally within the scope of predictive maintenance services accomplished by an aircraft engine manufacturer.

Shown schematically in FIG. 1 is a modular and autonomous assembly 1 for detecting the angular position of the blades of an impeller according to one embodiment of the invention, the detection assembly 1 being intended to be mounted on a turbine engine 10.

In the embodiment illustrated in FIG. 1, the modular and autonomous detection assembly, or kit 1 comprises a main housing 711, a first sensor 71 and a second sensor 72. In one variant, the assembly could comprise more than two sensors.

The main housing 711 comprises a communication unit 711a, a main power supply battery 711b, a storage unit 711c, two reversible attachment clips 711d and a main processing unit 711e.

One portion of the storage unit 711c is a random access memory of the RAM type dedicated to calculation and another portion of the storage unit 711c is a read-only memory of the NVRAM type for storing results and configuration parameters of the main processing unit 711e such as a processor.

The reversible manual attachment clips allow attaching the main housing 711 to a turbine engine 10 without using a tool and in an easily removable manner. The attachment clips 711d are physical multipoint attachments for mechanical connection to a turbine engine 10.

Each sensor 71 and 72 comprises a detection module, respectively denoted 71a and 72a, such as a Tip-timing sensor of the capacitive, optical, inductive or pressure type for example, a local battery, denoted respectively 71b and 72b, a communication module, denoted respectively 71c and 72c, allowing communication with the communication unit 711a of the main housing 71, two reversible attachment clips, denoted respectively 71d and 72d, and a local processing unit, denoted respectively 71e and 72e, such as a processor.

The reversible manual attachment clips 71d or 72d allow attaching the sensor 71 or 72 to a turbine engine 10 without using a tool and in an easily removable manner. The attachment clips 71d or 72d are physical multipoint attachments for mechanical connection to a turbine engine 10.

The information captured by the detection module 71a or 72a of the sensor 71 or 72 is delivered to the local processing unit 71e or 72e which prepares the signal prior to its transmission by the communication module 71c or 72c to the communication unit 711a of the main housing 711. The local processor 71e or 72e is capable of transforming the raw information acquired at several tens of kHz originating in the detection module 71a or 72a into a transmissible signal (digitizing, compression, pre-processing, detection of blade passage).

In the embodiment illustrated in FIG. 1, the communication module 71c or 72c of the sensors 71 and 72 is suited to the wireless transmission and reception of information, and the communication unit 711a of the main housing 711 is configured and suited to receive the information transmitted via a wireless communication network.

In one variant, the detection assembly 1 can comprise a single power source, such as a battery, located in the main housing 711 and supplying the sensors 71 and 72 with electrical energy via a wired connection.

Illustrated schematically in FIG. 2 is a turbine engine 10 according to one embodiment of the invention, on which is mounted the autonomous and modular assembly for detecting the angular position of the blades of an impeller of FIG. 1.

In the embodiment illustrated in FIG. 2, a detection kit 1 comprising only a first sensor 71 and a second sensor 72 is mounted on a turbine engine 10. The first sensor 71 is mounted on the nacelle of the turbine engine 10 facing the fan 11 to allow it to carry out monitoring of the health of the blading of the fan 11. The second sensor 72 is mounted on the nacelle of the turbine engine 10 facing the blading 12 of the low-pressure compressor stage. The main housing 711, for its part, is mounted on the casing of the fan of the turbine engine 10 on a low-temperature zone.

The first sensor 71 and the second sensor 72 are installed on the turbine engine in recesses 70 provided for this purpose and provided with a hatch for access from the nacelle allowing easily opening and closing access to the recesses for mounting or removing the sensors 71 and 72.

The main housing 711 can also be housed in a location provide for this purpose with a dedicated access hatch. The access hatch can also be made common with a recess dedicated to the reception of another element of the turbine engine, such as a hatch for access to the oil.

In the embodiment illustrated in FIG. 2, the turbine engine 10 comprises three other locations 70 provided for receiving sensors similar to the first and second sensors 71 and 72.

The first and the second of the three other locations 70, which are free in FIG. 2, are located at the rear of the turbine engine 10, for one of them, facing the low-pressure turbine stage 13, and, for the other, facing the high-pressure turbine stage 22. The third of the three other free locations 70 is located on the nacelle of the turbine engine 10 facing the high-pressure compressor stage 21.

Due to these locations 70, it would be possible, in another configuration, to have two other sensors positioned to monitor the high-pressure compressor stage 21 and the high-pressure turbine stage 22 which are coupled by the transmission shaft 19.

FIG. 3 illustrates schematically an assembly 20 for detecting damage to the movable blades of a bladed wheel 11, or impeller, of an aircraft turbine engine 10 having a first configuration.

The assembly 20 for detecting damage comprises the kit 1 for detecting the position of the blades of an impeller of FIG. 1 and alarm means 9.

To improve the legibility of FIG. 3, all the elements of the kit 1 have not been shown. The kit 1 does comprise all the elements described in FIG. 1, namely a main housing 711 including in particular the main processing unit 711e and a storage unit 711c in the form of one or more databases D1, D2, a first sensor 71 and a second sensor 72.

In addition to being used for the detection of the Top-Turn, the first sensor 71 and the second sensor 72 of the assembly 1 for detecting the position of the blades also form the means 7 for acquiring data of the assembly 20 for detecting damage.

When the kit 1 for detecting the position of the blades is integrated into an assembly 20 for detecting damage, the main processing unit 711e comprises additional means for accomplishing the detection of damage. The main processing unit is thus configured to execute a computer program comprising code instructions designed to implement an acquisition, signal processing, analysis and alarm algorithm according to the damage detection method of the invention.

The acquisition means 7 are configured to acquire a time signal $S_1$ relating to the movable blades 111 to 115 of an impeller 11, for example the impeller of the fan or of any other impeller of the engine 10.

Advantageously, the acquisition means 7 use a "tip-timing" technique to measure the passage time/instants TOA ("Time Of Arrival") of the movable blades 111 to 115.

As indicated in FIG. 2, the first sensor 71 of the acquisition means 7, which is a tip-timing sensor, is installed on the casing of the engine 10 in line with the impeller 11 of the fan so as to acquire a time signal $S_1$ specific to the first sensor 71.

More particularly, a tip-timing sensor 71 detects and counts the passages of the tips of the blades 111 to 115 with respect to a time base. Thus a tip-timing sensor 71 can measure the current passage time between the blades 111 to 115 relative to a reference point, also called "top-turn." For a tip-timing sensor 71, the passage times (TOA) specific to each blade 111 to 115 can then be deduced from the measured data by the main processing unit 711e, here via a calculation module 713 internal to the main processing unit 711e.

In other words, a tip-timing sensor 71 allows acquiring measurements relating to the passage times/instants of the tip of each movable blade 111 to 115 in line with a reference zone of the impeller 11. Moreover, in the case where several sensors 71 are used on the same impeller, it is possible, in order to limit the risk of loss of the tip-timing sensors 71, to position the sensors 71 so as to maximize their azimuthal distance in order to separate them from one another as much as possible. Thus, in the case of a local failure of a sensor 71 (for ex: impact of debris on a blade 111, fouling of a sensor 71), the risk that all the sensors 71 will be affected is minimized.

In normal operation, the blades 111 to 115 will regularly pass in front of the same tip-timing sensor 71. At a given speed, a time interval Δt between the passage of two consecutive blades will be measured for a sensor 71.

On the other hand, the alteration of the condition of a blade, due for instance to wear due to the ingestion of a foreign body FOD ("Foreign Object Damage"), can translate into a modification of the position of the blade at the moment when it passes in front of at least one of the sensors 71.

In order to be able to identify each blade 111 to 115, independently of their state, the main processing unit 711e is configured to analyze the different time signals $S_1$ relative to an angular reference.

In this embodiment the angular reference is supplied by the kit 1 for detecting a "top-turn" of FIG. 1, which allows in particular avoiding the use of a phonic wheel.

The assembly 1 for detecting a "top-turn" is configured to detect the relative angular position of the blades of a first impeller, such as the impeller 11 of the fan, the damage to the blades of which is monitored by means of the first sensor 71, and of a second impeller 12, the same air flow crossing the first and the second impellers 11 and 12 and, in the embodiment illustrated in FIG. 3, driven by the same shaft 19 of the turbine engine 10.

Damage to the blades of the second impeller 12 can also be monitored in the same manner as for the first impeller 11 by means of other tip-timing sensors mounted facing the second impeller 12, such as the second sensor 72.

The first impeller 11 comprises a first number of blades $N_1$ and the second impeller 12 comprises a second number of blades $N_2$, the first number of blades $N_1$ of the first impeller 11 and the second number of blades $N_2$ of the second impeller 12 being distinct and having no common divisor. The first and the second number of blades $N_1$ and $N_2$ are therefore mutually prime. The blades are regularly distributed over each of the impellers 11 and 12. Thus, on the same impeller 11 or 12 two adjacent blades are separated by the same angular interval.

The first and second sensors 71 and 72 are synchronized in time by the same clock and are configured to generate a signal at each passage of a blade of the first and second impeller 11 or 12 in front of the corresponding sensor 71 or 72.

The main processing unit 711e of the detection kit 1 is configured to determine the time interval separating the detection of a blade of the first impeller 11 from the detection of each of the blades of the second impeller 12.

The first on-board sensor 71 returns a first time signal $S_1$ each time that a blade of the first impeller 11 passes in front of it. The second on-board sensor 72 returns a second time signal $S_2$ each time that a blade of the second impeller 12 passes in front of it. The time interval between each detection, ΔT1 for the first impeller 11 and ΔT2 for the second impeller 12, depends on the speed of rotation of the shaft 19 and on the respective number of blades on the impeller 11 or 12.

Figure 4:
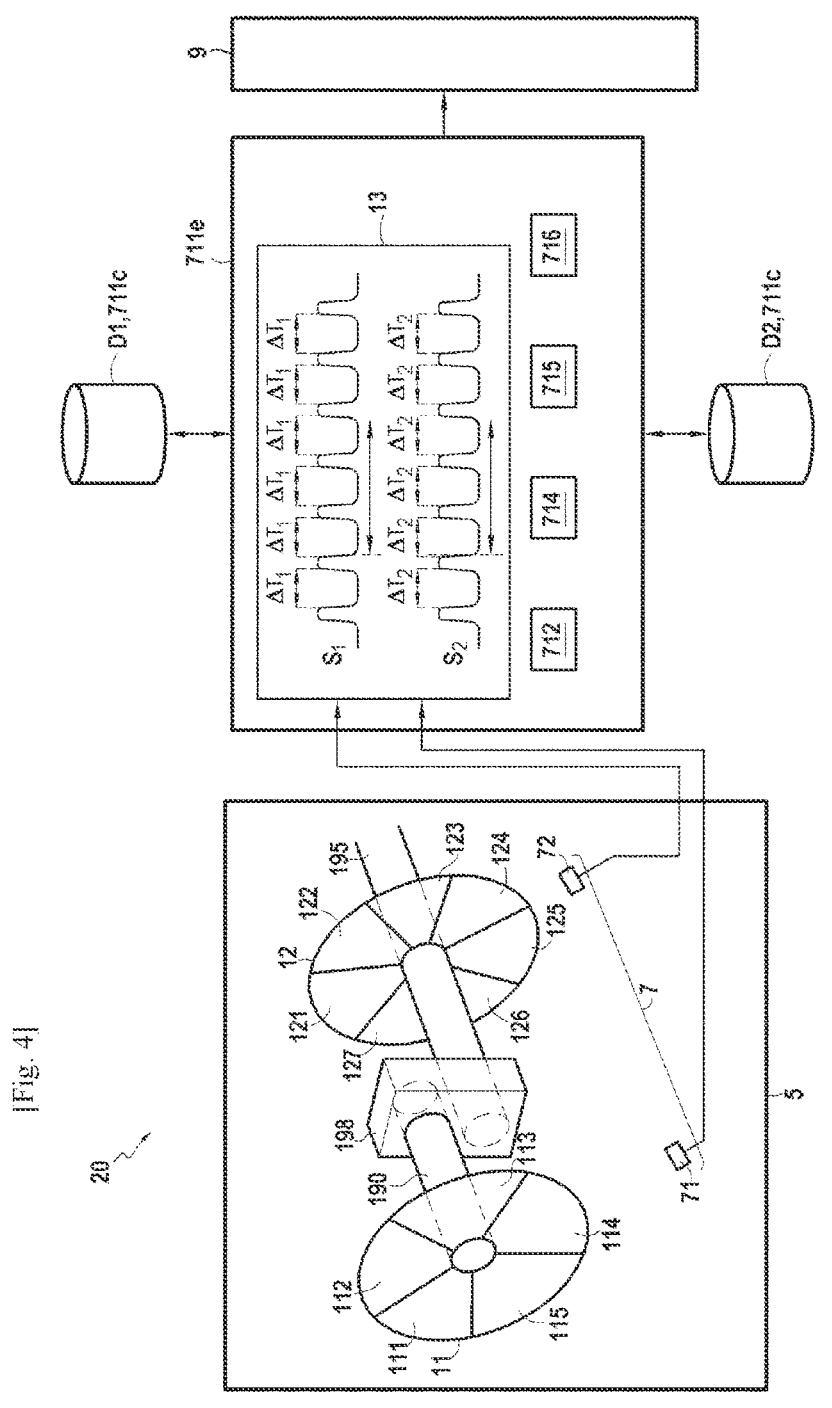

FIG. 4 illustrates schematically an assembly 20 for detecting damage to movable blades of an impeller 11 of an aircraft turbine engine 10 having a second configuration.

The second configuration of the turbine engine 10 illustrated in FIG. 4 differs from the first configuration of the turbomachine 10 illustrated in FIG. 3 in that an air flow, which may not be the same, passes through each of the first and second impellers 11 and 12 and they are driven by two distinct shafts 190 and 195 connected to one another by a reduction gear 198.

Shown in FIG. 5 is a flowchart of a method for detecting the angular position of the blades of an impeller of a turbine engine according to one embodiment of the invention.

The assembly 1 for detecting a top-turn can implement this method for detecting the top-turn.

The method comprises a first step 200 in which the first sensor 71 detects the passage of each blade 111 to 115 of the first impeller 11.

At the same time, in a second step 210, the second sensor 72 detects the passage of each blade 121 to 127 of the second impeller 12.

A disk amounts to $2\pi$ radians. Thus by making the link with the speed of rotation of the shaft, we have 1 rpm=$2\pi/60$ rad·s$^{-1}$.

For a fixed speed of rotation, denoted RPM below, the time interval separating the passage of two successive blades of the same impeller having a number N of blades in front of the sensor associated with the impeller is determined by the following equation:

$$\Delta t = \frac{60}{2\pi * \text{RPM}} * \frac{1}{N} \quad \text{[Math. 1]}$$

For the first impeller 11 and the first dedicated sensor 71 facing it, we have therefore:

$$\Delta t_1 = \frac{60}{2\pi * \text{RPM}} * \frac{1}{N_1} \quad \text{[Math. 2]}$$

And for the second impeller 12 and the second dedicated sensor 72 facing it, we have therefore:

$$\Delta t_2 = \frac{60}{2\pi * \text{RPM}} * \frac{1}{N_2} \quad \text{[Math. 3]}$$

The first and second sensors will therefore not have the same number of passage detections in the same rotation of the shaft.

In the embodiments illustrated in FIGS. 3 and 4, the first impeller 11 comprises five blades, or $N_1$=5, with references 111 to 115, and the second impeller 12 comprises 7 blades, or $N_2$=7, with references 121 to 127. To facilitate calculation, the speed of the shaft is considered to be equal to $60/2\pi$ revolutions per minute, or RPM=$60/2\pi$ rpm.

With these characteristics and considering that the sensors have the same angular position for simplification, the list of passage times of the following blades at the completion of the first step 200 and of the second step 210 is obtained:

TABLE 1

| First sensor 71 | Second sensor 72 |
|---|---|
| 0.100 | 0.050 |
| 0.300 | 0.192 |
| 0.500 | 0.335 |
| 0.700 | 0.478 |
| 0.900 | 0.621 |
| 1.100 | 0.764 |
| 1.300 | 0.907 |

It is important to note that the blades are not necessarily initially facing the sensor, which introduces a delay before the first detection.

In a third step 220, the main processing unit 711e calculates the time interval $\Delta t$ separating the passage of one blade of the first impeller 11 from each of the blades 121 to 127 of the second impeller 12.

If, in the first embodiment illustrated in FIG. 3 where the two impellers 11 and 12 are driven by the same shaft 19, the arrival time of the blades 111 to 115 of the first impeller 11 is compared with the arrival time of the blades 121 to 127 of the second impeller 12, this matrix is obtained:

TABLE 2

| $\Delta T$ | 111 | 112 | 113 | 114 | 115 |
|---|---|---|---|---|---|
| 121 (turn 1) | 0.05 | 0.25 | 0.45 | 0.65 | 0.85 |
| 122 | −0.092 | 0.107 | 0.307 | 0.507 | 0.707 |
| 123 | −0.235 | −0.035 | 0.164 | 0.364 | 0.564 |
| 124 | −0.378 | −0.178 | 0.021 | 0.221 | 0.421 |
| 125 | −0.521 | −0.321 | −0.121 | 0.078 | 0.278 |
| 126 | −0.664 | −0.464 | −0.264 | −0.064 | 0.135 |
| 127 | −0.807 | −0.607 | −0.407 | −0.207 | −0.007 |
| 121 (turn 2) | 0.05 | 0.25 | 0.45 | 0.65 | 0.85 |

The values of the matrix correspond to the difference between the arrival times of the blades 111 to 115 of the first impeller 11 with the arrival time of the blades 121 to 127 of the second impeller 12, i.e. to the time intervals denoted $\Delta T$.

In one variant, the calculation of the time interval $\Delta T$ can take into account the reduction coefficient of the speed reduction device 198, if it is present.

For example, in the second embodiment illustrated in FIG. 4, the two impellers 11 and 12 are not located on the same shaft, but are driven by two distinct shafts 190 and 195 coupled together via a speed reduction device with a factor $C_{reduction}$. For the first impeller 11 and the first dedicated sensor 71 facing, we have therefore:

$$\Delta t_1 = \frac{60}{2\pi * C_{reduction} * \text{RPM}} * \frac{1}{N_1} \quad \text{[Math. 4]}$$

And for the second impeller 12 and the second dedicated sensor 72 facing it, we have therefore:

$$\Delta t_2 = \frac{60}{2\pi * \text{RPM}} * \frac{1}{N_2} \quad \text{[Math. 5]}$$

If a similar comparison is made in the second embodiment, but this time by calculating the difference between a first time corresponding to the product of the factor $C_{reduction}$ and the arrival time of the blades 111 to 115 of the first impeller 11 and a second time corresponding to the arrival time of the blades 121 to 127 of the second impeller 12, the same matrix is obtained as indicated in the table designated Table 2.

The matrix table thus offers as many angular references as are desired. As indicated in the matrix table, the blades are also no longer aligned from one impeller to the other. If two impellers are aligned so as to have one blade of each impeller aligned together, there would be one cell in the table for which the difference would be zero.

A database of this type can then be used by an algorithm.

In one variant, the calculation of the time interval $\Delta T$ can be normalized with respect to the speed of rotation of the shaft 19 driving the two impellers 11 and 12 so that the calculation is independent of the speed of rotation.

Then, in a fourth step 230, the main processing unit 711e determines the relative angular position of each blade 111 to 115 of the first impeller 11 relative to the angular position of the blades 121 to 127 of the second impeller 12 based on the values of the intervals ΔT and the value of the speed of the first and second impellers 11 and 12.

In the example illustrated in FIGS. 1 and 2 and the tables above, it is the last two blades 115 and 127 to be detected for the end of a turn which have the smallest temporal gap Δt. But this result remains random because it is linked to the offset shift of the first detection. The difference in offset between the two impellers 11 and 12 will be linked, for its part, to the mounting of the first and second impellers 11 and 12 on the shaft 19, and to the angular position of the first and second sensors 71 and 72. This offset therefore relates to the production and the assembly of the turbine engine 10.

With an alignment of the first and second sensors 71 and 72 to the same angular reference, the offset is solely linked to the assembly of the impellers 11 and 12 on the shaft 19 and to their relative alignment.

This offset is characteristic of the turbine engine 10, and the resulting alignment between the blades of one impeller to the other is inherent in the turbine engine 10. This alignment, shown here relative to the passage time of the blades facing the Tip-Timing sensor, which is finally the time signature of this alignment of the blades.

Finally, in a fifth step 240, the main processing unit 711e designates as an angular reference, i.e. as a top-turn, the blade of the first impeller 11 having the smallest temporal gap Δt with a blade of the second impeller 12.

As mentioned above, the fifth blade 115 of the first impeller 11 and the seventh blade 127 of the second impeller 12 are the most aligned.

This peculiarity of alignment allows deciding arbitrarily that the fifth blade 115 of the first impeller 11 will be considered as the Top Turn, i.e. as the angular reference. Another blade of the first impeller 11 could have been arbitrarily designated as the top-turn based on the analysis of the matrix table above.

The alignment of the blades of one impeller to the other remains identical, because it is linked to assembly, and to the respective number of blades of the impellers. The identification of the top turn necessitates only one turn to be identified by the algorithm deployed.

Thus, at each flight of the aircraft comprising a turbine engine 10, the first turn of the engine 10 allows reconstituting the Top-Turn. Then each detection of the blade selected as the top-turn will give the time reference, in the tip-timing sense, and the angular reference of the top-turn.

The system 20 for detecting damage to a blade seeks to detect a lasting degradation of the performance of one or more blades 111 to 115 linked to damage, and not to a simple temporary perturbation observable on the signal $S_1$. Thus, the angular reference (top turn T12) described above is solely used to identify each of the blades 111 to 115 relative to the others. The detection of damage to a blade, which will be described hereafter, therefore does not consist here of the simple observation or detection of the variation of the interval Δt between the impulses measured between the blades 111 by each tip-timing sensor 71.

At least one tip-timing sensor 71 can be used to measure the speed of the engine 10 of the aircraft.

Each tip-timing sensor 71 can be of the capacitive, inductive, Foucault current type or even an optical probe, these different types being durable, accurate and requiring little space.

One example of implementation of a method of detecting damage to one or more movable blades 111 constituting the impeller implemented by the assembly 20 for detecting damage is now described.

As illustrated in FIG. 6, this method comprises a step of measuring E1 the speed of the engine 10 carried out by the acquisition means 7. As explained above, the measurement of the engine speed 10 can be accomplished by a tip-timing sensor 71.

In parallel, the tip-timing sensor 71 or 72 of an impeller 11 or 12 carries out measurements relating to the passage times/instants of the top of each movable blade in line with the sensor. The processing means 11 then perform a conditioning of the measurements originating in the tip-timing sensor 71 or 72. This conditioning consists of identifying in real time each blade in the time signal measured by means of an angular reference, extracting from the time signal the passage time (TOA) relating to an identified blade, associating with the identified blade its extracted passage time as well as information relating to its turn number (step E2).

For each acquisition of a passage time (TOA) of a blade, the main processing unit 711e calculates, via the calculation module 713, a deflection of the tip of this blade (step E3), i.e. the spatial gap of the blade tip 111 relative to its theoretical position at rest.

Then, during a step E4, the main processing unit 711e extracts, via an extraction module 712 illustrated in FIG. 3, the dynamic component for each calculated deflection, i.e. isolates it from the static component. The extraction of the dynamic component is accomplished by means of isolation methods known in the prior art (for ex: averaging, or the use of a high-pass filter to extract a high-frequency component).

The main processing unit 711e also accomplishes, via a selection module 714, a step of selecting S one or more ranges of engine 10 speed for which all the blades of the impeller 11 are assumed to be synchronous, i.e. assumed to have the same vibrational behavior for the same engine 10 speed range. The engine 10 speed ranges are pre-identified here relative to a reference database, for example the database D1, as guaranteeing that all the blades have the same vibrational behavior when they pass in line with the tip-timing sensor 71 or 72.

For the purpose of identifying possible damage to one or more blades for each selected range of engine 10 speed during the selection step S, the processing means 11 also comprise a processing module 715 taking as its input the dynamic components selected by the selection module 714.

The processing module 715 is configured to determine (step E5) a possible variation of the dynamic behavior of each blade, by determining a variation of the dynamic components of each blade, and by relating these variations to a reference database. In addition, the results of the determination step E5 are added to the monitoring database, here the database D2. Thus, the determination step E5 can be seen as a step of analysis of the dynamic vibrational behavior of each blade for each engine speed range selected during the selection step S.

The main processing unit 711e then proceeds, via a comparator 716, with a comparison step E6 following the determination step E5. The comparison step E6 consists of comparing each detected variation of a dynamic component of the deflection of a blade 111, i.e. each variation of its dynamic behavior, with one or more pre-recorded thresholds in the reference database D1.

During this step E6, each variation of a dynamic component, hence of dynamic behavior, detected for a blade 111 is compared in particular to a first variation threshold, which corresponds indirectly to a state of health of the blade. This first threshold is linked to a second threshold which relates to the variation of the natural frequency of the blade 111, reaching this threshold corresponding to damage to the blade 111.

The first and second thresholds were determined, then recorded in the reference database D1 during an initial learning phase E9.

The detection of a variation in the dynamic component of the deflection of the blade 111, i.e. the variation of its dynamic behavior, it therefore linked here to the indirect detection of a deviation in the natural frequency of this blade 111, this deviation beyond a predetermined threshold translating damage to it.

Thus, if the variation of the dynamic component of the deflection/of the dynamic behavior of the blade 111 is greater than the first variation threshold, that signifies that the natural frequency of the blade 111 itself has a deviation translating damage to the blade 111. In fact, damage to the blade 111 leads to a deviation of its natural frequency and therefore to a deviation of the dynamic component of its deflection.

Consequently, when the comparator 716 detects that the variation of the dynamic component of the deflection/of the dynamic behavior of the blade 111 is greater than or equal to the first threshold, the blade 111 is identified (step E7) as damaged.

An alarm indicating damage to the blade 111 is then transmitted (step E8) to the alarm means 9 (via, for example audible and/or display means). Likewise, messages to be sent or to be made available to maintenance can be triggered during the transmission of the alarm.

The invention claimed is:

1. A modular and autonomous assembly for detecting the angular position of the blades of an impeller intended to be mounted on a turbine engine,
   wherein the assembly comprises at least one electrical power source allowing the operation of the elements of the detection assembly independently of the turbine engine on which it is intended to be carried, at least one first sensor mounted on a casing enclosing blades of the first impeller and intended to be associated with the first impeller, at least one second sensor intended to be associated with the second impeller, and a main housing including a main processing unit and storage means.

2. The modular and autonomous detection assembly according to claim 1, wherein the main housing, said at least one first sensor and said at least one second sensor each comprises reversible manual attachment means allowing them to be removably mounted on the turbine engine.

3. The modular and autonomous detection assembly according to claim 1, wherein each first and second sensor comprises a detection module, a local processing module, and communication means configured to deliver the measurements of the corresponding sensor to the processing unit.

4. The modular and autonomous detection assembly according to claim 3, wherein each first and second sensor also comprises a power source for the sensor, and the communication means are wireless communication means.

5. The modular and autonomous detection assembly according to claim 1, intended to be mounted on a turbine engine including a first impeller comprising a first number of blades and a second impeller comprising a second number of blades, each of the two impellers having an air flow passing through it and being coupled directly or indirectly to one another, and the first number of blades of the first impeller and the second number of blades of the second impeller being distinct and mutually prime, each of said sensors being configured to generate a signal at each passage of a blade of an impeller in front of the sensor, and the main processing unit being configured to determine the time interval separating the detection of a blade of the first impeller with the detection of each of the blades of the second impeller.

6. The modular and autonomous detection assembly according to claim 1, wherein the main housing also comprises a clock module on which are synchronized said at least one first and at least one second sensors.

7. The modular and autonomous detection assembly according to claim 1, wherein said at least one first and at least one second sensor has a frequency bandwidth corresponding to the rotation speeds of the shaft for which the blades are detected.

8. An assembly for detecting damage to a blade of an impeller of a turbine engine, comprising a modular and autonomous assembly for detecting the angular position of the blades of an impeller according to claim 1, and alarm means.

9. A turbine engine configured to receive an autonomous and modular assembly for detecting damage to a blade of an impeller of a turbine engine according to claim 8, the turbine engine comprising, for each element of the assembly among the main housing, said at least one first sensor and said at least one second sensor, a recess and a hatch for access to said recess.

10. A turbine engine configured to receive an autonomous and modular assembly for detecting the angular position of the blades of an impeller according to claim 1 the turbine engine comprising, for each element of the assembly among the main housing, said at least one first sensor and said at least one second sensor, a recess and a hatch for access to said recess.

11. The turbine engine according to claim 10, comprising a first impeller comprising a first number of blades and a second impeller comprising a second number of blades, each of the two impellers having an air flow passing through it and being coupled directly or indirectly to one another, and the first number of blades of the first impeller and the second number of blades of the second impeller being distinct and mutually prime.

12. The turbine engine according to claim 10, comprising an autonomous and modular detection assembly for detecting the angular position of the blades of an impeller intended to be mounted on a turbine engine,
    wherein the assembly comprises at least one electrical power source allowing the operation of the elements of the detection assembly independently of the turbine engine on which it is intended to be carried, at least one first sensor intended to be associated with the first impeller, at least one second sensor intended to be associated with the second impeller, and a main housing including a main processing unit and storage means.

13. An aircraft comprising at least one turbine engine according to claim 10.

14. The turbine engine according to claim 10, comprising an assembly for detecting damage to a blade of an impeller of a turbine engine, the assembly for detecting damage to the blade of the impeller comprising a modular and autonomous assembly for detecting the angular position of the blades of the impeller,
    wherein the assembly for detecting the angular position of the blades of the impeller comprises at least one electrical power source allowing the operation of the elements of the detection assembly independently of the turbine engine on which it is intended to be carried, at least one first sensor intended to be associated with the first impeller, at least one second sensor intended to be associated with the second impeller, and a main housing including a main processing unit and storage means.

15. The modular and autonomous detection assembly according to claim 1, wherein the casing enclosing the blades of the first impeller, encloses blades of the second impeller, and wherein the at least one second sensor is mounted on said casing.

16. The modular and autonomous detection assembly according to claim 15, wherein the casing enclosing the blades of the second impeller includes a second recess, and wherein the at least one second sensor is mounted in the second recess.

17. The modular and autonomous detection assembly according to claim 1, wherein the casing enclosing the blades of the first impeller includes a first recess, and wherein the at least one first sensor is mounted in the first recess.

18. The modular and autonomous detection assembly according to claim 15, wherein the blades of the second impeller are blades of the low-compressor stage, and wherein the at least second sensor are configured to face the blades of the low-compressor stage when mounted on the casing.

* * * * *